United States Patent [19]

Gonzalez

[11] Patent Number: 5,402,827
[45] Date of Patent: Apr. 4, 1995

[54] SINGLE CONTROL CARTRIDGE VALVE

[75] Inventor: Teodoro J. Gonzalez, Santa Clarita, Calif.

[73] Assignee: Emhart Inc., Newark, Del.

[21] Appl. No.: 117,824

[22] Filed: Sep. 8, 1993

[51] Int. Cl.6 ........................................... F16K 11/074
[52] U.S. Cl. .............................. 137/625.17; 137/625.4; 137/636.3; 137/271
[58] Field of Search ............ 137/625.17, 625.4, 625.41, 137/636.2, 636.3, 454.6, 271

[56] References Cited

U.S. PATENT DOCUMENTS

| | | | |
|---|---|---|---|
| 3,476,149 | 11/1969 | Dornaus | 137/625.4 |
| 3,533,436 | 10/1970 | Parkison | 137/454.6 |
| 4,362,186 | 12/1982 | Parkison et al. | 137/625.4 X |
| 4,596,376 | 6/1986 | Knapp | 137/625.17 X |
| 4,657,045 | 4/1987 | Kitamura | 137/625.4 |
| 4,733,688 | 3/1988 | Lorch | 137/454.6 |
| 4,856,556 | 8/1989 | Mennigmann | 137/625.17 X |
| 4,971,113 | 11/1990 | Pawelzik et al. | 137/625.17 |
| 4,997,005 | 3/1991 | Pawelzik et al. | 137/625.4 X |
| 5,080,134 | 1/1992 | Orlandi | 137/625.4 X |
| 5,095,934 | 3/1992 | Iqbal | 137/625.41 X |
| 5,232,022 | 8/1993 | Gougouyan | 137/625.17 X |

Primary Examiner—John Rivell
Attorney, Agent, or Firm—J. Bruce Hoofnagle

[57] ABSTRACT

A single control water mixing valve assembly which includes a fixed and a movable ceramic plate mounted within a housing in contact with one another and which serve to control the flow of water from hot and cold inlet ports to an outlet port. Linear and rotary movement is transmitted from a lever through a bushing to the movable plate as the lever is turned on a radial axis within the bushing and rotated about the longitudinal axis of the lever. The fixed plate is spaced from the base and tubular resilient seals are positioned in the space and firmly held in place within the space by radial ribs. The lever is received in a channel in the bushing with the sides of the lever adjacent to the sides of the channel, so that rotation of the lever about its longitudinal axis transmits torque to the bushing which, in turn, transmits the torque to the movable plate.

23 Claims, 5 Drawing Sheets

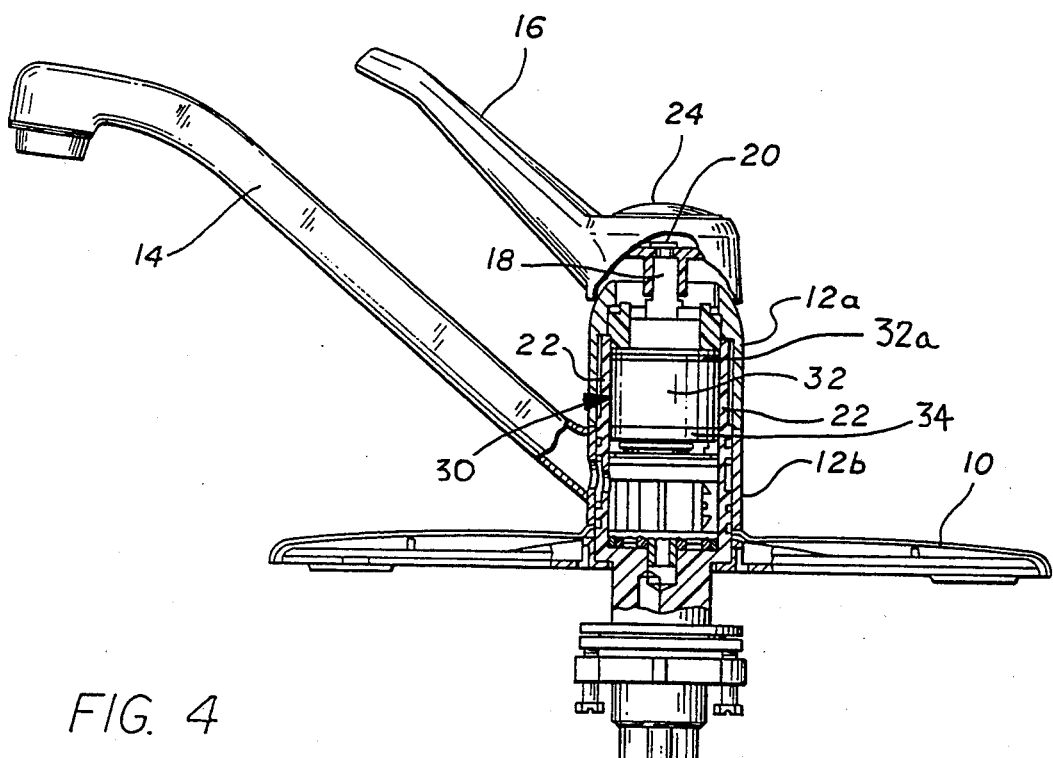
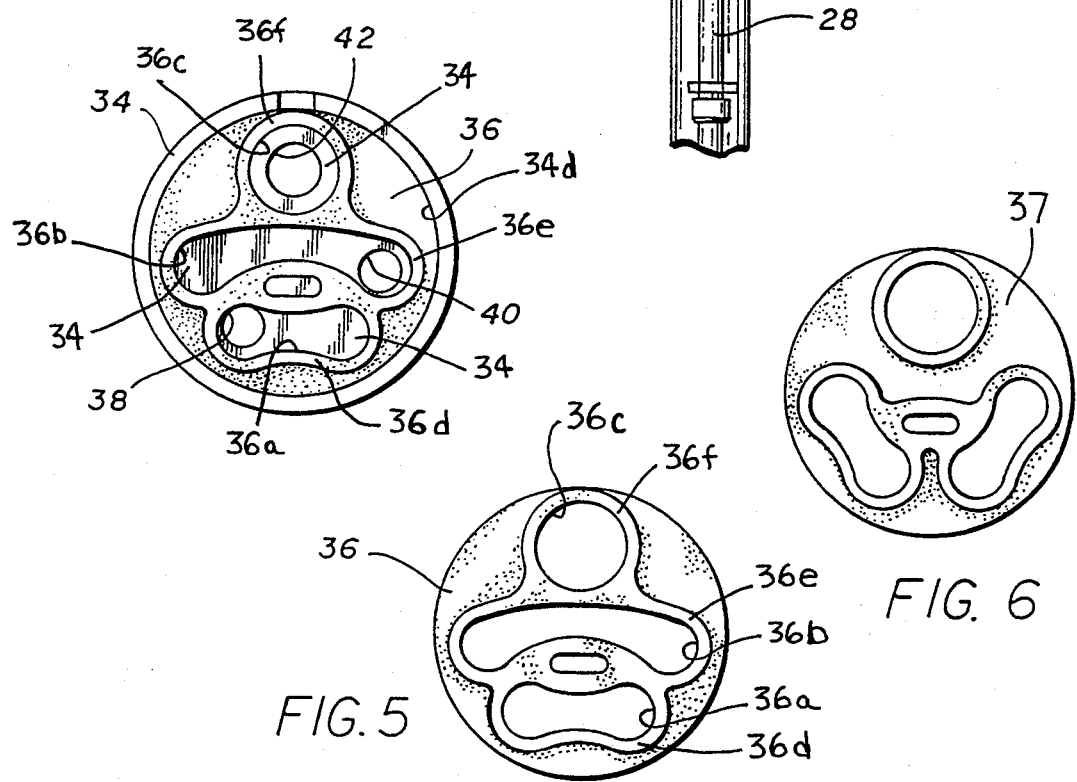

SINGLE CONTROL CARTRIDGE VALVE

BACKGROUND OF THE INVENTION

The invention is concerned with a single control water mixing valve of the general type described, for example, in U.S. Pat. Nos. 3,965,936; 4,738,281; and 5,095,934. The mixing valve of the invention includes a fixed ceramic plate and a movable ceramic plate both mounted inside a plastic housing and in contact with one another, and a lever coupled to the movable plate for moving the movable plate linearly and angularly with respect to the fixed plate.

As described in U.S. Pat. No. 4,738,281, water mixing valves with plates formed of sintered alumina oxide (ceramic) in mutual contact, are presently in wide use in the field of sanitary ware. The ceramic plates very often comprise duct elements communicating from one plate to another so that the flow selection of hot and cold water is made adjustable before mixing by positioning the two plates. The usual prior art systems have a fixed ceramic plate and a movable ceramic plate, whose relative position may be varied by means of a single control in the form of a lever. The lever is controlled by the user to adjust the mixed water flow rate and also to adjust the ratio of the two water flow rates in the mixture.

SUMMARY OF THE INVENTION

The invention provides an improved construction for a self-lubricating ceramic plate mixing valve of the type referred to above in which the lower end of the housing is enclosed by a removable base member having an annular lip and a bottom, and which has three ports in the bottom for hot and cold water inlets and for a mixed water outlet, respectively. A fixed ceramic plate is received in the annular lip of the base in a spaced relationship with the bottom, and three resilient tubular seals are received in the base in the space between the bottom and the fixed ceramic plate. The tubular seals surround respective ones of the three ports, and the base is compartmentalized to cause the seals to be held securely in place during operation of the valve.

The outer face of the bottom of the base is recessed to receive a disc-shaped gasket which serves to seal the cartridge valve to the casing of the assembly, and also to direct water from hot and cold water inlet tubes to the corresponding hot and cold inlet apertures in the bottom of the base. Two types of gaskets are provided to adapt the valve to alternate relative locations of the hot and cold water supply tubes.

A rotatable nylon bushing is included in the assembly which receives the lever and which turns in the housing when the lever is turned on its longitudinal axis. The bushing defines rotary stops that engage shoulders within the housing, and which are positioned to distribute rotary forces in a manner to avoid shearing.

Wells are provided in the sealing surface of the fixed plate to reduce surface area so as to minimize molecular attraction and to avoid sticking between the fixed and movable plates.

BRIEF DESCRIPTION OF THE DRAWINGS

FIG. 1 is an elevational view, partly in section, of a kitchen faucet assembly of the single control type, and which incorporates a cartridge valve constructed in accordance with one embodiment of the present invention;

FIG. 4 is an end view of the assembly of FIG. 3 taken along the line 4—4, and showing a gasket which is received in the base of the assembly;

FIGS. 5 and 6 show two different forms of the gasket which is received in the base of the assembly, as shown in FIG. 4;

DETAILED DESCRIPTION OF THE ILLUSTRATED EMBODIMENT

Figure 2:
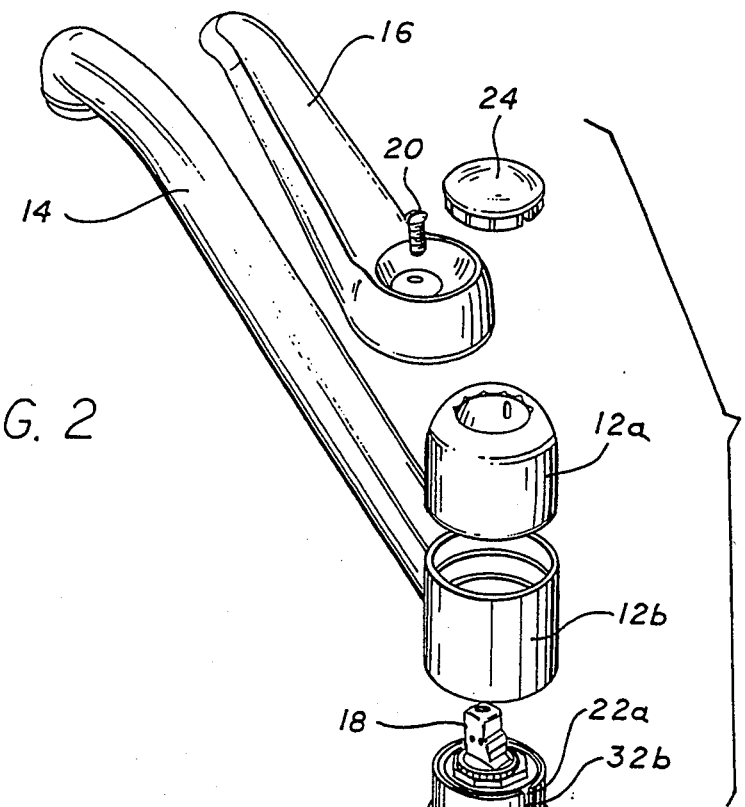
FIG. 2 is a perspective exploded representation of the assembly of FIG. 1.
Figure 3:
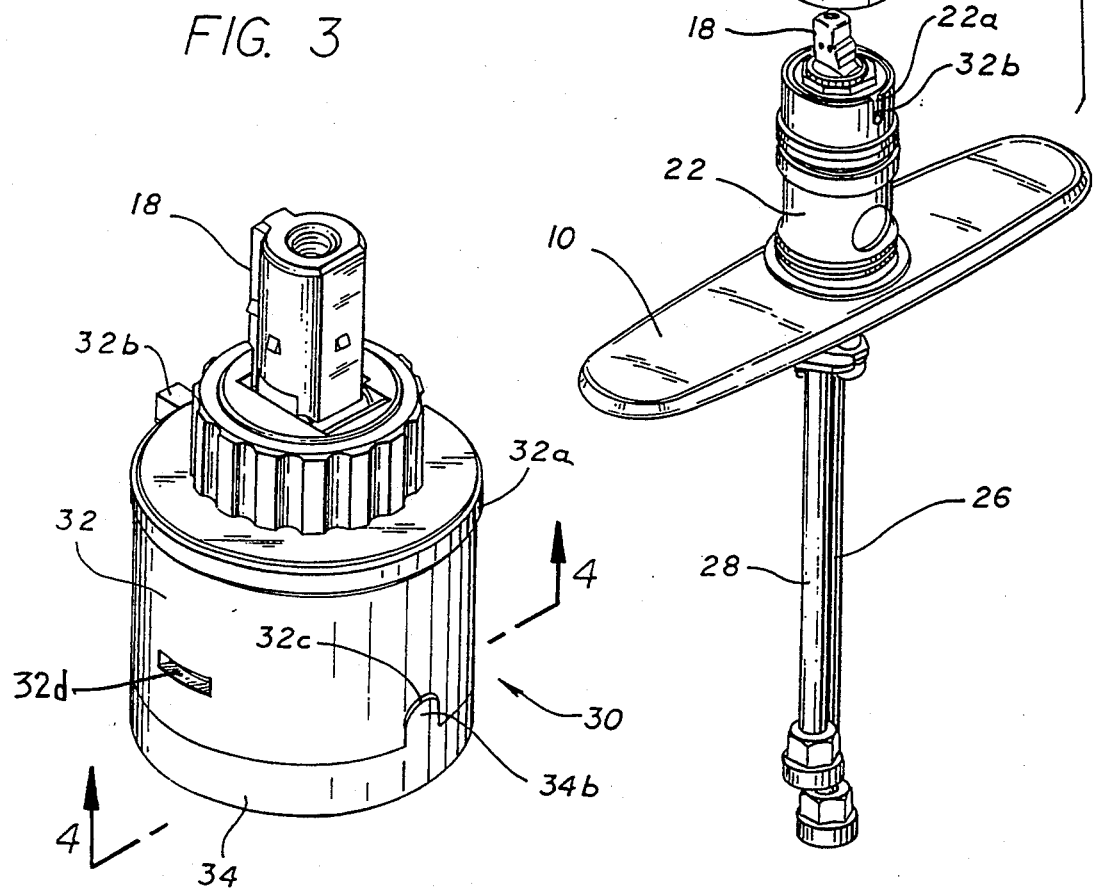
FIG. 3 is a perspective view of a cartridge valve which is constructed in accordance with the concepts of the present invention, and which is included in the assembly of FIGS. 1 and 2.

The overall kitchen faucet assembly shown in FIGS. 1 and 2 includes a base plate 10 which serves to mount the assembly on a sink, or the like. The faucet assembly also includes a two-piece outer tubular sleeve 12a and 12b, piece 12a being threaded to a brass casing 22, and piece 12b being rotatably mounted on the casing. A spout 14 extends outwardly from the lower piece 12b, and it communicates with an annular space between sleeve 12b and casing 22. An operator 16 operates a cartridge valve 30 (FIG. 3). Operator 16 is fitted over the top of the sleeve 12a, and is secured to a lever 18 by means of a screw 20. Operator 16 may take the form of an elongated handle, as shown, or a knob, or other configuration. Lever 18 is part of the cartridge valve 30 forming the subject matter of the present invention. A cover 24 fits over the base of operator 16. The operator 16 is secured to lever 18, so that when the operator is rocked back or forth, lever 18 is also rocked. When the operator 16 is turned about the top of sleeve 12a, the lever 18 likewise is turned. The turning motion of lever 18 by operator 16 causes the cartridge valve 30 to mix proportional amounts of hot and cold water supplied to the valve through a cold inlet tube 26 and a hot inlet tube 28; whereas rocking movement of the operator controls the amount of hot and cold water mixture supplied to the spout 14.

Figure 9:
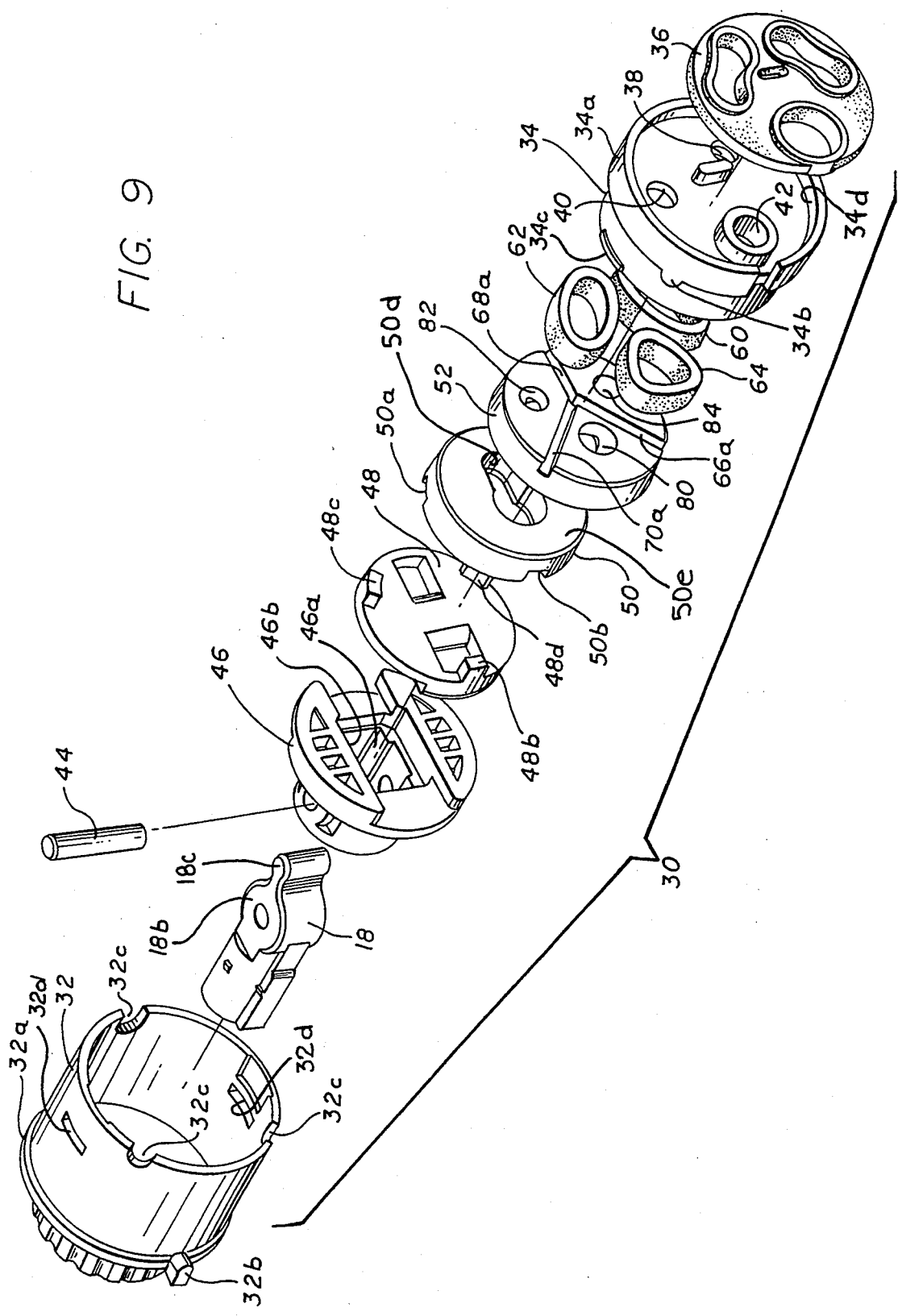
FIG. 9 is a perspective exploded view of the cartridge assembly taken from one end of the assembly.

The cartridge valve 30 is shown in FIGS. 3, 7, 9 and 10. The cartridge valve 30 includes a housing 32 formed of an appropriate plastic such as acetal (Delrin). The housing 32 has a tubular configuration. A disc-shaped base 34 includes an integral lip portion 34a of reduced diameter which extends into the lower end of housing 32, and includes protuberances, such as protuberance 34b, which are received in slots 32c in the bottom of housing 32, as shown in FIG. 3. The base 34 supports a fixed ceramic plate 52 in the lip portion 34a, with the plate being spaced from the bottom of the base. Three resilient tubular seals 60, 62 and 64 are housed in the space between the plate 52 and the bottom of the base 34. The seals 60, 62 and 64 are separated by radial ribs 66, 68 and 70. The base 34 is indexed to the end of housing 32 by the protuberances 34b, and held securely by latches (FIGS. 9 and 10) which extend into slots 32d (FIG. 9).

Figure 8:
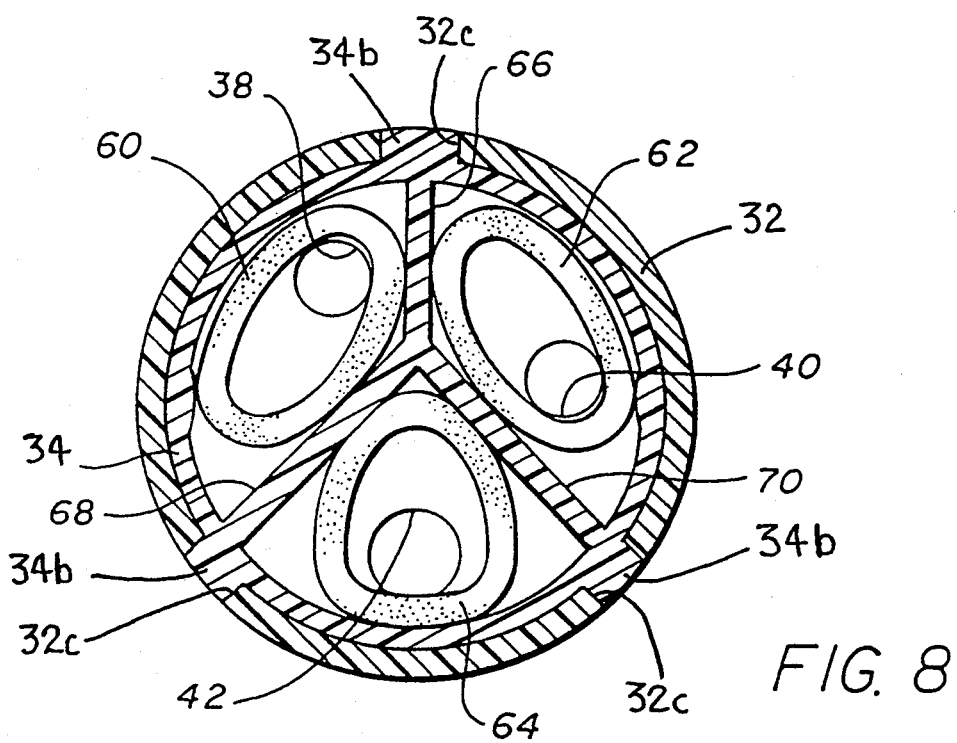
FIG. 8 is a cross-section of the cartridge valve of FIG. 7 taken essentially along the line 8—8 of FIG. 7.

As best shown in the bottom view of FIG. 4, a gasket 36 is received in an external recess 34d in the bottom of base 34, and it serves to seal the assembly to the inside surface of casing 22 of FIG. 2. As shown in FIGS. 4 and 9, the base 34 has a hot water inlet port 38 and a cold water inlet port 40 extending through it, and it also has an outlet port 42. Gasket 36 has openings 36a, 36b and 36c in it of a selected configuration surrounding the respective ports 38, 40, 42, as shown in FIGS. 4 and 5, to direct cold water from the cold water inlet tube 26 of FIG. 2 to the cold water inlet port 38, and to direct hot water from the hot water inlet port 28 to the hot water inlet port 40. The seals 60, 62, and 64 surround respective ones of the ports 38, 40, 42 in the base 34, as best shown in FIG. 8.

As pointed out: in U.S. Pat. No. 5,095,934, it is often convenient to have faucets in two different rooms placed on opposite sides of a common wall so that both can use common supply tubes. In this situation, the cold water supply tube which is on the right for the first faucet is on the left for the other. In order to provide universal utility for the cartridge assembly 50, a second gasket 37 is provided, as shown in FIG. 6, which has a different configuration such that the hot and cold water inlet tubes 26 and 28 are effectively reversed insofar as water flow to the inlet ports 38 and 40 is concerned. Accordingly, the installer may conveniently carry the two, types of gaskets 36, 37, and install the appropriate gasket depending upon the relationship between the hot water inlet tube 26 and the cold water inlet tube 28. Gaskets 36 and 37 are formed with ridges, such as integral ridges 36d, 36e and 36f (FIGS. 4 and 5) surrounding respective openings 36a, 36d and 36c, to form passages between the gaskets and the base 34.

Figure 7:
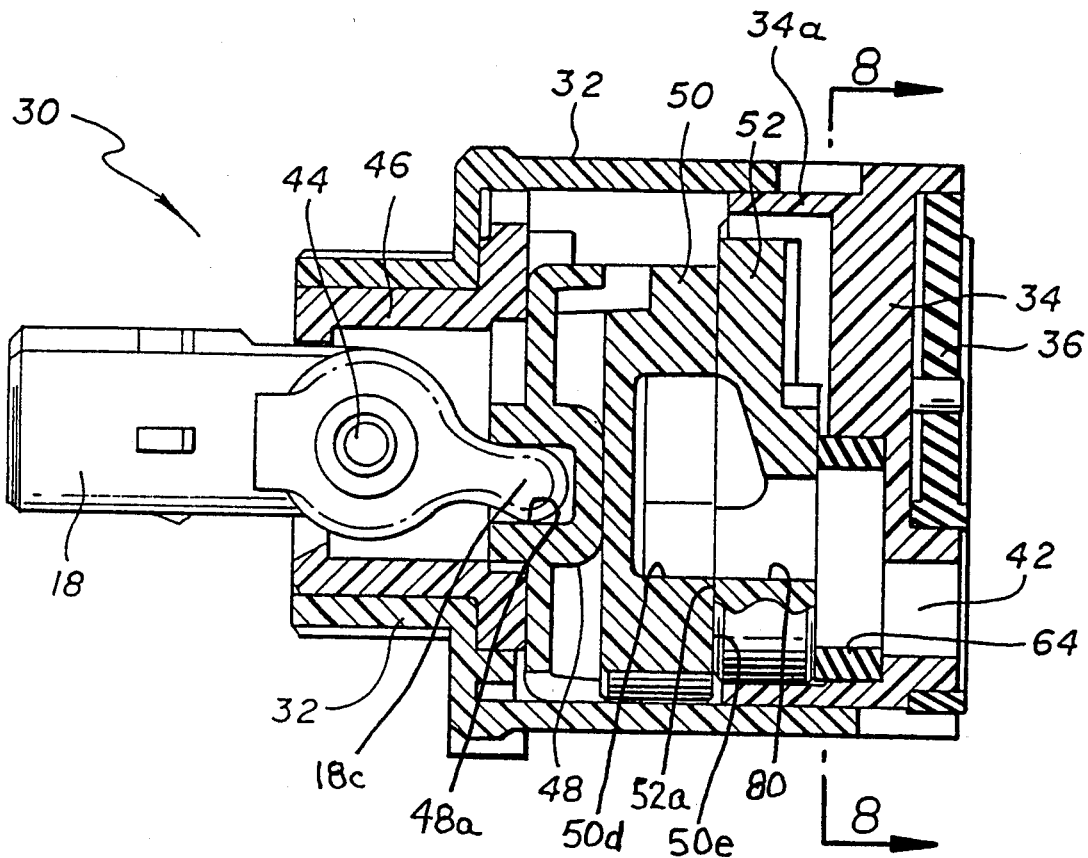
FIG. 7 is a side sectional view of the cartridge valve included in the assembly of FIGS. 1 and 2.

As shown in FIG. 7, lever 18 is supported in a bushing 46 on a pin 44 which extends transversely across the bushing. The bushing 46 is rotatable about the longitudinal axis of housing 32. The end of the lever 18 extends into a movable coupler 48, so that when the lever is rocked, coupler 48 moves reciprocally across the housing. When the lever 18 is rotated, bushing 46 rotates about the longitudinal axis of housing 32, and the movable coupler 48 rotates about an axis established by the angular position of lever 18.

A movable ceramic plate 50 is secured to the coupling 48, and the movable plate is reciprocated back and forth and rotated by the coupler. The movable plate 50 is formed with a depression 50d (FIG. 9) in one surface 50e thereof which surface is mounted in contact with an interfacing surface 52a of stationary plate 52 as shown in FIG. 7. Surface 50e of movable plate 50 is movable linearly and angularly across the surface 52a of the stationary plate in a self-sealing relationship, to provide controlled communication through depression 50d between the hot and cold inlet ports 38 and 40 and the outlet ports 42.

As shown, the stationary plate 52 is received in the annular integral lip 34a of base 34, and it is held in a fixed position within housing 32 by the base. As shown in FIG. 8, the three tubular resilient seals 60, 62 and 64 are supported on the inner side of base 34, and these seals Surround the cold water inlet port 38, the hot water inlet pore 40, and the outlet port 42 respectively. The tubular seals 60, 62 and 64 are housed within compartments separated by the ribs 66, 68 and 70 which meet in a "Y" configuration. The annular lip 34a of base 34 receives the stationary plate 52, as mentioned above, with the ribs 66, 68 and 70 being received in corresponding channels 66a, 68a and 70a in the bottom of the stationary plate, as best shown in FIG. 9. In this manner, the ribs 66, 68 and 70 are trapped at the bottom of base 34 within the channels 66a, 68a and 70a, respectively, to be firmly held in place, so as to withstand water pressure passing through the ports and seals and thereby avoiding damage to base 34.

As best shown in FIG. 9, the stationary plate 52 has ports 80, 82 and 84 which are aligned respectively with the ports 42, 40 and 38 in the base. As stated above, ribs 66, 68 and 70, provide reinforcement to seals 60, 62 and 64, and avoid blowout of the seals during operation of the assembly.

Figure 10:
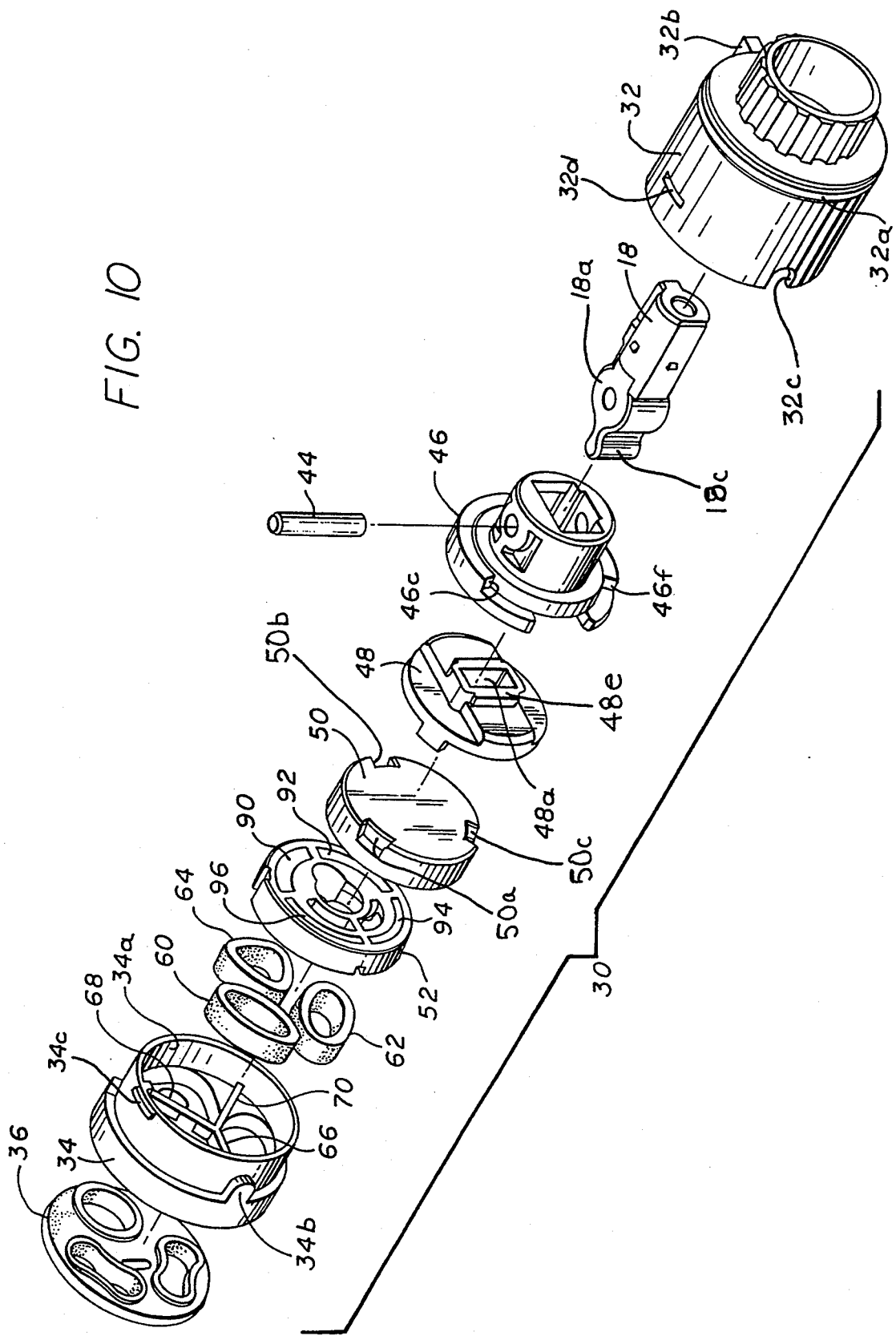
FIG. 10 is an exploded perspective view of the cartridge assembly taken from the other end.

As best shown in FIG. 10, wells are formed in the sealing surface of the stationary plate 52 which engages the surface of the movable plate 50. These wells are designated 90, 92, 94 and 96 in FIG. 10. The wells serve to reduce the surface area of the stationary plate 52 to reduce molecular attraction between the plates 52 and 50 to obviate sticking of the plates to one another. The wells also serve as receptacles for silicone lubrication grease which may be used in the assembly.

As shown in FIG. 3, housing 32 has an upper rim 32a which provides a close fit inside the brass casing 22 (FIGS. 1 and 2). The housing 32 also has a protuberance 32b (FIGS. 2 and 3) which fits into a slot 22a in the brass housing 22 (FIG. 2) to guide the cartridge valve 30 into proper alignment during assembly, and also to prevent rotation of the cartridge valve when the operator is turning the operator 16.

Bushing 46 is preferably formed of a nylon which is resistant to expansion in contact with water. Glass filled nylon also may be used for strength. Bushing 46 provides two stops 46c, and 46f (FIG. 10) which engage shoulders inside of housing 32 to limit rotary travel of the operator 16. Torque is transmitted to bushing 46 from the operator 16 through lever 18 from its flat side walls 18a, 18b to the side walls 46a and 46b of bushing 46, as well as through pin 44. This causes the bushing 46 to rotate as the lever 18 is turned about its longitudinal axis. Coupler 48 has a transverse slot 48a formed in a longitudinally protruding tongue 48e of the coupler. This protruding tongue 48e is received in a transverse channel 46d in the end of bushing 46 so that torque from the bushing may be transmitted to the coupler 48. The protruding tongue 48e of coupler 48 moves transversely along the transverse channel 46d in the bushing 46 when lever 18 is pivotally moved on pin 44. The stops distribute forces along the side walls of the bushing and avoid shearing of the parts. Rotation of bushing 46 transmits torque to coupler 48 and plate 50 as described above. Other elements serve as torque-bearing surfaces during rotation of the assembly in addition to the flat surfaces 18a, 18b of lever 18, including the tip 18c of the lever within slot 48a of coupler 48 (FIG. 10), as well as pin 44 which also causes the bushing 46 to turn as the lever is turned about its longitudinal axis. All of the foregoing elements combine to provide a distribution of torque-receiving forces so as to avoid fracture of the plastic elements.

As best shown in FIG. 9, coupler 48 has protuberances 48b, 48c and 48d which are received in slots, such as slots 50a, 50b and 50c in the movable plate 50. This causes the coupler 46 to be firmly attached to the movable plate 50, so that rotation of the coupler as well as linear movements are communicated to the movable plate.

Accordingly, the coupler 48 and movable plate 50 move as a unit in the transverse slot in bushing 46 as lever 18 is turned about the axis of pin 44. Also, the coupler 48 and movable plate 50 turn as a unit as the lever 18 is turned about its longitudinal axis to turn bushing 46 within the housing 32.

The effectiveness of a ceramic valve depends on the success of how well the fixed and movable ceramic plates 50, 52 (FIG. 8) produce the seal that will control the flow of water. Water is forced through the valve by pressure which in turn presses on the plates. The direction to which the plates are pressed by the water pressure depends in the configuration and design of the valve. How easily or difficult the valve operates also depends on the configuration used to load the two plates. Ceramic plates 50, 52 are manufactured with super polished finish for the purpose of achieving a water seal when the two plates are placed together. The two contacting surfaces create a suction-like sticking effect between them. This attraction of the plates is noticeable on any ceramic plate set and it would appear that the attraction of the two plates would be enough to provide an adequate seal. However, the sticking effect of the plates is lost when substantial water pressure is applied to the valve. Water pressure when applied to a ceramic valve will build up in all the open cavities found between the plates. These pressurized areas have the tendency to separate the plates away from each other and lose that desired seal union.

Existing valve designs have incorporated ways to keep plates from separting and prevent losing the seal. Most common is the encapsulation of the valve with tight tolerances so as to restrict the movement of the plates to just the necessary wiping motion. Others are designed to require critical tightening forces at assembly to barely allow plate movement. All of these techniques only add more to the complexity and manufacturing cost of the valves.

With the awareness of how ceramic plates are loaded with water pressure and their behavior to separate or attract, the resilient tubular seals 60, 62 are designed to have cross-sections larger than the corresponding ports 82, 84 in the fixed plate 52, so that the water pressure will be exerted on the fixed plate which increases by a predetermined amount as the valve is turned to increase water flow through the valve. Likewise, the openings in gasket 36 are larger than the corresponding ports 38 & 40 in base 34 so that bulging of the base as pressure increases is inhibited.

Balancing the areas of pressure in the ceramic plates will produce the proper contact force to achieve the seal regardless of varying water pressures and part tolerances. The plates float inside the valve letting water pressure do the work of allowing just the necessary force to act in the direction which keep the plates together. This design allows larger pressurized areas on the side of the plates that will keep them together in one direction. The force that keeps the plates together is a function of the sum of the areas being pressurized working in the direction of the seal. Accordingly, an area pressure ratio was selected to satisfy the performance of the plates in both open or closed conditions. By controlling pressure instead of part tolerance, part and assembly tolerances no longer are affected and can be relaxed to reduce manufacturing costs. The pressure ratio selected for the valve guarantees enough plate contact force to prevent separation caused by the pressure fluctuations expected to occur in water lines.

By managing the pressurized surfaces and by proper loading of the plates the valve is made with less parts and permits ample manufacturing tolerances, at the same time the design is free to use non-critical materials and generate looser assembly controls. All the benefits results in a more economical valve. Functionally, the valve operates with less effort since water pressure changes have less effect on the ratio of pressures producing the seal.

The invention provides, therefore, an improved construction for a single control water mixing valve cartridge which operates with a high degree of efficiency to accomplish its desired purpose.

It will be appreciated that although a particular embodiment of the invention has been shown and described, modifications may be made. It is intended in the claims to cover all such modifications, which come within the true spirit and scope of the invention.

I claim:

1. A single control water mixing valve assembly to be coupled to hot and cold water inlet tubes comprising: a tubular housing of a prescribed external configuration; a disc-shaped base member having a base portion of the prescribed external configuration enclosing one end of said housing and having first and second inlet ports to be coupled to respective ones of said tubes, and having an outlet port; said base member being formed with an integral lip portion of reduced diameter and extending from said base portion and which is received within said one end of said housing; a fixed valve plate mounted in said housing and in, said integral lip portion of said base member in coaxial relationship therewith and parallel to and spaced from said base portion of said base member; sealing means mounted in the space between said fixed plate and said base portion of said base member; a bushing member rotatably mounted in said housing in coaxial relationship therewith; a pin member mounted in said bushing member and extending thereacross; a lever member mounted on said pin member for pivotal movement about the longitudinal axis thereof, said lever member having a tip portion protruding through one end of said bushing member; a movable valve plate mounted in said housing in coaxial relationship therewith and in facing contacting relationship with said fixed plate; coupling means attached to said movable plate and coupled to said bushing member, said coupling means being configured to receive the protruding tip portion of said lever member so that pivotal movement of said lever member about said pin member transmits transverse linear motion to said movable plate with respect to said fixed plate, and rotation of said lever member about its longitudinal axis causes said bushing member to rotate in said housing and transmit angular movement to said movable plate with respect to said fixed plate; said fixed and movable plates each having a flat, smooth surface in contact with one another, and said fixed plate having a first and second inlet ports aligned respectively with said first and second inlet ports of said base member to be in communication with respective ones of the two inlet tubes, and said fixed plate further having an outlet port aligned with the outlet port on said base member, and said movable plate having a depression in the surface thereof to control the flow of water from the two inlet ports in the fixed plate to the outlet port thereof as determined by the selected linear and angular position of said movable plate with respect to said fixed plate.

2. The water mixing valve assembly of claim 1, in which said fixed and movable plates are self-sealing and formed of a ceramic material.

3. The water mixing valve assembly defined in claim 1, in which said sealing means comprises three resilient tubular members forming passages between respective ones of said ports in said base member and said ports in said fixed plate.

4. The water mixing valve assembly defined in claim 3, in which said resilient tubular members have cross-sectional areas greater than said ports to enable water pressure to be exerted on the underside of said fixed plate.

5. The water mixing valve assembly defined in claim 1, in which each of said plates is formed with a periphery and in which the contacting flat, smooth surface of at least one of said plates has at least one well formed therein in a space between the periphery and any water flow passage formed in the surface and in a position to preclude interfacing positioning of said well with any water passage of the other of said plates to reduce the surface area thereof and to form a receptacle for a lubricant.

6. The water mixing valve assembly defined in claim 1, in which the coupling means affixed to said movable plate includes a transverse channel on the outer surface thereof for receiving the tip portion of the lever.

7. The water mixing valve assembly defined in claim 1, in which said bushing includes integral stop members which engage internal shoulders in said housing to limit the angular movement of said bushing in said housing.

8. The water mixing valve assembly defined in claim 1, in which said bushing has a longitudinal channel therein which receives said lever, with said lever and said channel having mutually engaging flat sides which assist in transmitting torque from said lever to said bushing as said lever is turned about its longitudinal axis.

9. A single control water mixing valve assembly comprising: a tubular housing of a prescribed external configuration; a base member having a base portion of the prescribed external configuration and an integral lip portion of reduced diameter which is received within one end of said housing for enclosing said one end; a fixed plate mounted in said lip portion in said housing in coaxial relationship therewith; a bushing member rotatably mounted in said housing in coaxial relationship therewith; a pin member mounted in said bushing member and extending thereacross; a lever member pivotally mounted on said pin member for angular movement about the longitudinal axis thereof, said lever member having a tip portion protruding through one end of said bushing member; a movable plate mounted in said housing in coaxial relationship therewith and in facing contacting relationship with said fixed plate; coupling means attached to said movable plate and coupled to said bushing, said coupling means being configured to receive the protruding tip portion of said lever so that pivotal movement of said lever about said pin member transmits transverse linear movement to said movable plate with respect to said fixed plate, and rotation of said lever about its longitudinal axis causes said bushing to rotate in said housing and transmit angular movement to said movable plate with respect to said fixed plate.

10. The water mixing valve assembly defined in claim 9, in which said fixed and movable plates are formed of ceramic material and are self-sealing.

11. The water mixing valve assembly defined in claim 9 in which said bushing includes an integral stop member which engages internal shoulders in said housing to limit angular movement of said bushing in said housing.

12. The water mixing valve assembly defined in claim 9, in which said bushing has a channel therein which receives said lever, with said lever and said channel having mutually engaging flat sides which assist in transmitting torque from said lever to said bushing as said lever is turned about its longitudinal axis.

13. A single control water mixing valve assembly to be coupled to hot and cold water inlet tubes comprising: a tubular housing of prescribed external configuration; a disc-shaped base member enclosing one end of said housing having first and second inlet ports to be coupled to respective ones of said tubes and having an outlet port; said base member having a base portion of the prescribed external configuration and an integral lip portion of reduced diameter which is received within one end of said housing for enclosing said one end; a fixed valve plate mounted in said lip portion in said housing in coaxial relationship therewith and parallel to and spaced from said base member; sealing means mounted in the space between said fixed plate and said base member, said fixed plate having first and second inlet ports aligned respectively with said first and second inlet ports of said base member to be in communication with respective ones of the two inlet tubes, and said fixed plate having an outlet port aligned with the outlet port in said base member.

14. The water mixing valve assembly defined in claim 13, in which said sealing means comprises three tubular resilient members forming passages between respective ones of said ports in said base member and said ports in said fixed plate.

15. A single control water mixing valve assembly to be coupled to hot and cold water tubes comprising: a tubular housing; a disc-shaped base member enclosing one end of said housing having first and second inlet ports to be respectively coupled to selected ones of said tubes; a fixed valve plate mounted in said housing in coaxial relationship therewith; said fixed plate having first and second inlet ports coupled to respective ones of said first and second inlet ports of said base member; and a gasket mounted coaxially with said base on the outer surface thereof, said gasket having apertures of a predetermined configuration offset from corresponding ones of said inlet ports in said base member and having ridges surrounding the apertures to form passages between the gasket and the base member for directing water from the hot and cold inlet tubes respectively to selected ones of the first and second inlet ports in said base member.

16. A single control water mixing valve assembly to be coupled to hot and cold water inlet tubes comprising: a tubular housing; a disc-shaped base member enclosing one end of said housing having first and second inlet ports to be coupled to respective ones of said tubes, and having an outlet port; a fixed valve plate mounted in said housing in coaxial relationship therewith and parallel to and spaced from said base member; sealing means mounted in the space between said fixed plate and said base member; a bushing member rotatably mounted in said housing in coaxial relationship therewith; a pin member mounted in said bushing member and extending thereacross; a lever member mounted on said pin member for pivotal movement about the longitudinal axis thereof, said lever member having a tip portion protruding through one end of said bushing member; a movable valve plate mounted in said housing in coaxial relationship therewith and in facing contacting relationship with said fixed plate; coupling means attached to said movable plate and coupled to said bushing member, said coupling means being configured to receive the protruding tip portion of said lever member so that pivotal movement of said lever member about said pin member transmits transverse linear motion to said movable plate with respect to said fixed plate, and rotation of said lever member about its longitudinal axis causes said bushing member to rotate in said housing and transmit angular movement to said movable plate with respect to said fixed plate; said fixed and movable plates each having a flat, smooth surface in contact with one another, and said fixed plate having a first and second inlet ports aligned respectively with said first and second inlet ports of said base member to be in communication with respective ones of the two inlet tubes, and said fixed plate further having an outlet port aligned with the outlet port on said base member, said sealing means including three resilient tubular members forming passages between respective ones of said ports in said base member and said ports in said fixed plate; a plurality of ribs integral with said base member and positioned within the space between said base member and said fixed plate, said fixed plate is formed with a corresponding plurality of channels for receiving respective ones of said ribs, so as to separate and reinforce said resilient tubular members; and said movable plate having a depression in the surface thereof to control the flow of water from the two inlet ports in the fixed plate to the outlet port thereof as determined by the selected linear and angular position of said movable plate with respect to said fixed plate.

17. A single control water mixing valve assembly to be coupled to hot and cold water inlet tubes comprising: a tubular housing; a disc-shaped base member enclosing one end of said housing having first and second inlet ports to be coupled to respective ones of said tubes, and having an outlet port; a fixed valve plate mounted in said housing in coaxial relationship therewith and parallel to and spaced from said base member; sealing means mounted in the space between said fixed plate and said base member; a bushing member rotatably mounted in said housing in coaxial relationship therewith; a pin member mounted in said bushing member and extending thereacross; a lever member mounted on said pin member for pivotal movement about the longitudinal axis thereof, said lever member having a tip portion protruding through one end of said bushing member; a movable valve plate mounted in said housing in coaxial relationship therewith and in facing contacting relationship with said fixed plate; coupling means attached to said movable plate and coupled to said bushing member, said coupling means being configured to receive the protruding tip portion of said lever member so that pivotal movement of said lever member about said pin member transmits transverse linear motion to said movable plate with respect to said fixed plate, and rotation of said lever member about its longitudinal axis causes said bushing member to rotate in said housing and transmit angular movement to said movable plate with respect to said fixed plate; said fixed and movable plates each having a flat, smooth surface in contact with one another, and said fixed plate having a first and second inlet ports aligned respectively with said first and second inlet ports of said base member to be in communication with respective ones of the two inlet tubes, and said fixed plate further having an outlet port aligned with the outlet port on said base member, said movable plate having a depression in the surface thereof to control the flow of water from the two inlet ports in the fixed plate to the outlet port thereof as determined by the selected linear and angular position of said movable plate with respect to said fixed plate; and a gasket mounted coaxially with said base on the outer surface thereof, said gasket having apertures of predetermined configurations offset from corresponding ones of said inlet ports in said base member and having ridges surrounding the apertures to form passages between the gasket and the base member for directing water from the hot and cold inlet tubes to selected ones of the first and second inlet ports in said base member.

18. The water mixing valve assembly defined in claim 17, in which said apertures in said gasket expose predetermined areas of the underside of said base member to exert water pressure on said areas.

19. A single control water mixing valve assembly to be coupled to hot and cold water inlet tubes comprising: a tubular housing; a disc-shaped base member enclosing one end of said housing having first and second inlet ports to be coupled to respective ones of said tubes and having an outlet port; a fixed valve plate mounted in said housing in coaxial relationship therewith and parallel to and spaced from said base member; sealing means mounted in the space between said fixed plate and said base member, said fixed plate having first and second inlet ports aligned respectively with said first and second inlet ports of said base member to be in communication with respective ones of the two inlet tubes, said fixed plate having an outlet port aligned with the outlet port in said base member; said sealing means including three tubular resilient members forming passages between respective ones of said ports in said base member and said ports in said fixed plate; a plurality of ribs formed integrally with said base member, and a corresponding plurality of channels formed on the lower surface of the fixed plate for receiving respective ones of said ribs so as to provide reinforcement for said tubular resilient members.

20. A single control water mixing valve assembly to be coupled to hot and cold water inlet tubes comprising: a tubular housing; a disc-shaped base member enclosing one end of said housing having first and second inlet ports to be coupled to respective ones of said tubes and having an outlet port; a fixed valve plate mounted in said housing in coaxial relationship therewith and parallel to and spaced from said base member; sealing means mounted in the space between said fixed plate and said base member, said fixed plate having first and second inlet ports aligned respectively with said first and second inlet ports of said base member to be in communication with respective ones of the two inlet tubes, said fixed plate having an outlet port aligned with the outlet port in said base member; and a plurality of ribs formed integrally with said base member for receiving and providing reinforcement for said sealing means.

21. A single control water mixing valve assembly to be coupled to hot and cold water inlet tubes comprising: a tubular housing; a disc-shaped base member enclosing one end of said housing having first and second inlet ports to be coupled to respective ones of said tubes and having an outlet port; a fixed valve plate mounted in said housing in coaxial relationship therewith and parallel to and spaced from said base member; sealing means mounted in the space between said fixed plate and said base member, said fixed plate having first and second inlet ports aligned respectively with said first and second inlet ports of said base member to be in communication with respective ones of the two inlet tubes, said fixed plate having an outlet port aligned with the outlet port in said base member; said sealing means including at least one tubular resilient member forming a passage between a respective one of said ports in said base member and a respective one of said ports in said fixed plate; and at least a pair of radial ribs formed integrally with said base member for receiving therebetween and providing reinforcement for said at least one tubular resilient member.

22. The water mixing valve assembly defined in claim 1, further comprising: a first gasket mountable on an outer surface of said base member formed with a first aperture for forming a passage between the hot inlet tube and the first inlet port of said base member and a second aperture for forming a passage between the cold inlet tube and the second inlet port of the base member; and a second gasket mountable on the outer surface of said base member formed with a first aperture for forming a passage between the cold inlet tube and the first inlet port of said base member and a second aperture for forming a passage between the hot inlet tube and the second inlet port of said base member said first and second gaskets being interchangeable.

23. A single control water mixing valve assembly to be coupled to hot and cold water inlet tubes comprising: a housing; a base member enclosing one end of said housing having first and second inlet ports to be coupled to respective ones of said tubes, and having an outlet port; a fixed valve plate mounted in said housing adjacent said base member; a movable valve plate mounted in said housing in facing contacting relationship with said fixed plate; means for transmitting transverse linear lateral motion to said movable plate with respect to said fixed plate and to transmit angular movement to said movable plate with respect to said fixed plate; said fixed and movable plates each having a flat, smooth surface in contact with one another, and said fixed plate having first and second inlet ports aligned respectively with said first and second inlet ports of said base member to be in communication with respective ones of the two inlet tubes, and said fixed plate further having an outlet port aligned with the outlet port on said base member, said moveable plate having a depression in the surface thereof to control the flow or water from the two inlet ports in the fixed plate to the outlet port thereof as determined by the selected linear and angular position of said movable plate with respect to said fixed plate; a first gasket mountable on the outer surface of said base, member, said first gasket having a first aperture for forming a passage between the hot inlet tube and the first inlet port of the base member and a second aperture for forming a passage between the cold inlet tube and the second inlet port of the base member; and a second gasket mountable on the outer surface of said base, member, said second gasket having a first aperture for forming a passage between the cold inlet tube and the first inlet port of the base member and a second aperture for forming a passage between the hot inlet tube and the second inlet port of said base member said first and second gaskets being interchangeable.

* * * * *